June 25, 1935.  E. EISEMANN  2,006,297

FILM FEEDING MECHANISM FOR CINEMATOGRAPH APPARATUS

Filed Oct. 28, 1933

Patented June 25, 1935

2,006,297

UNITED STATES PATENT OFFICE 2,006,297

FILM FEEDING MECHANISM FOR CINEMATOGRAPH APPARATUS

Ernst Eisemann, Stuttgart, Germany, assignor to Robert Bosch Aktiengesellschaft, Stuttgart, Germany Application October 28, 1933, Serial No. 695,710 In Germany November 8, 1932

10 Claims. (Cl. 88—18.2)

The present invention relates to improvements in or relating to film feeding mechanism for cinematograph apparatus.

In cinematograph film feeding apparatus which is set up in the projection or viewing room, particularly in the case of narrow film apparatus the maltese cross mechanism which is very often employed for film feeding, cannot generally be employed because it causes too much noise. In these forms of apparatus therefore, claw mechanisms have been employed for moving the film, and on these the claws engage directly with the perforations of the film and so feed it forward. Such constructions however have the disadvantage that the film is very rapidly destroyed mechanically by the engagement of the claws in the perforations.

It is an object of the present invention to provide an improved film feeding device which is not subject to these disadvantages.

In the film feeding device according to the present invention the film is moved by means of a feed roller provided with depressions, projections or teeth with which one or more feed pins or the like engage for rotating the feed roller intermittently, the said pin or pins maintaining their engagement with the said depressions, projections or teeth during the rotary feeding movement of the feed roller.

Means are preferably provided for maintaining the feed roller stationary between successive feeding movements. Such means may for example comprise one or more control or arresting pins which engage the said depressions, projections or teeth while the feed pin or pins is/are out of engagement. The said pins may be operated from a common drive shaft through the intermediary of one or more cams, eccentrics or the like. The said feed pins and control pins may be arranged substantially diametrically opposed to one another and may be connected by means of a pin and slot connection or the like in such manner that the one pin may transmit motion to the other pin along its length whilst permitting relative movement between the pins in a direction at right angles. Any suitable means may be provided for constraining the motion of the pins, and any suitably arranged springs may be employed for maintaining close engagement of cams and followers where these are employed. The control or arresting pin or pins are preferably arranged to reciprocate substantially radially with respect to the drum whilst the feed pins have a combined reciprocatory and oscillatory movement. Any suitable quick lift cams or the like may be employed for causing rapid feeding movement of the feed roller.

In order that the invention may be well understood a preferred embodiment thereof will now be described by way of example only, with reference to the accompanying drawing in which:

Figs. 5 and 6 are two views of the control rod.

Figs. 7 and 8 are two views of the feed lever.

Fig. 9 shows the feeding cam in detail.

Figure 1:
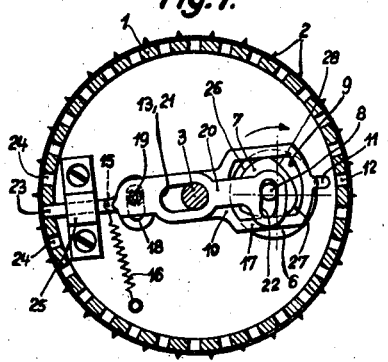
Figures 1 to 3 are side elevations of a preferred form of film feeding mechanism in three different positions of operation, the feed roller being shown in section.
Figure 2:
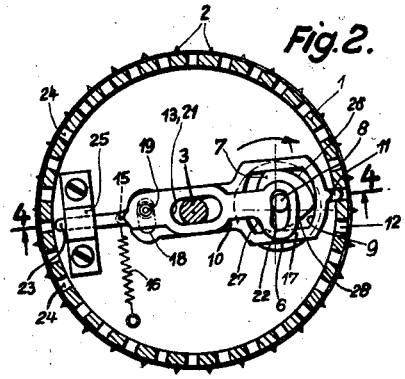
Figure 3:
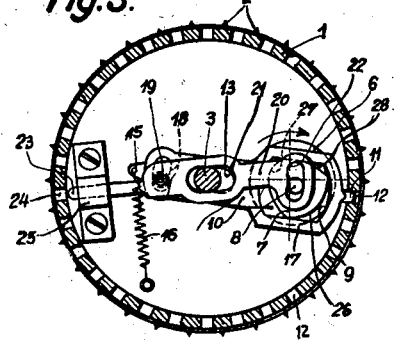

Referring to the drawing, 1 is a feed roller of which only the periphery is shown in Figures 1 to 3. The feed roller 1 is provided with sprocket teeth 2 which engage in the perforations of the film for feeding it forwards. The feed roller 1 is rotatably mounted on a fixed shaft 3.

Figure 4:
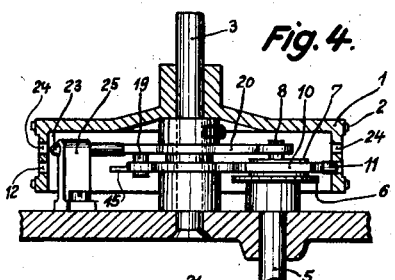
Figure 4 is a section on the line 4—4 of Figure 2.
Figure 7:
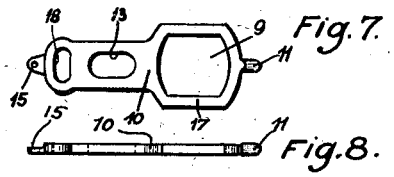
Figure 8:
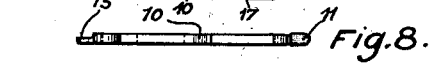

The feeding mechanism is driven by a driving shaft 5 (see Figure 4). The front end of the shaft 5 is shown in end elevation in Figure 3 and carries a more or less heart shaped cam 7. The cam 7 moves in an aperture 9 on the enlarged end of a feed lever 10 (see Figures 1 to 3), which is shown in detail in Figures 7 and 8 in plan view and side elevation. At the large end the lever 10 is provided with a pin 11 which engages in depressions or holes 12 in the periphery of the feed roller 1, for the purpose of rotating the latter intermittently. The lever 10 is provided with a longitudinal slot 13 through which the shaft 3 passes so that the lever 10 can move at right angles to the axis of the shaft 3. The end of the lever 10 remote from the pin 11 (i. e. the left hand end in Figures 1 to 3) is connected at 15 to a spring 16 which presses the part 17 of the lever 10 against the cam 7, so that there can be no free play or lost motion between these parts. The lever 10 is further provided near the left hand end with a transverse arcuate slot 18 in which a pin 19 carried by a control rod 20 engages.

Figure 5:
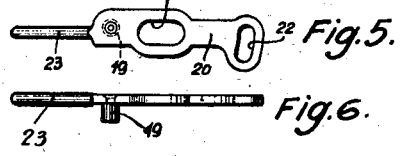
Figures 5 to 9 show details of the mechanism.
Figure 6:
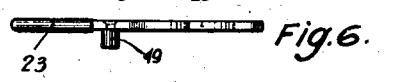
Figure 9:
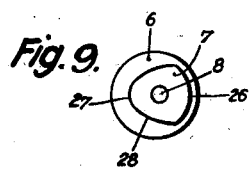

The control rod 20 is shown in detail in Figures 5 and 6 in plan view and side elevation. It is provided with a longitudinal slot 21 like the slot 13 and through which the shaft 3 likewise passes, so that the rod 20 can also reciprocate on the shaft 3 perpendicular to the axis thereof. The control rod 20 is provided at one end with a lateral extension provided with a transverse arcuate slot 22 in which engages an eccentric pin 8 carried by the cam 7, which serves for imparting to the control rod 20 a reciprocating movement perpendicular to the axis of the feed roller. On the other end of the control rod 20 (left hand end) is a pin 23 which engages in holes or depressions 24 on the periphery of the feed roller and holds it against movement during the period of rest. The holes 24 are in a plane which is displaced axially of the feed roller, with respect to the plane of the holes 12. The distance apart of these two series of holes is equal to the distance apart of the lever 10 and rod 20. If desired however a single row of holes could be provided and in this case one or both of the pins 11 or 23 or the members carrying them must be so bent that the ends of the pins lie in the same plane.

The arresting or control pin 23 is guided in its reciprocating movement by a guide 25.

The mechanism described operates as follows:

Assuming that the mechanism is in the position shown in Figure 1 with the feed pin 11 out of engagement with the feed roller 1 and the control or arresting pin 23 engaging with the feed roller and holding it stationary. If now the shaft 5 is rotated in the direction of the arrow the eccentric pin 8 urges the control rod 20 to the right so that the pin 23 releases the feed roller for movement. The mechanism then comes into the position shown in Figure 2. During this movement the feed lever 10 is moved to the right by the control rod 20 through the pin 19 so that the pin 11 comes into engagement with one of the holes 12 of the feed roller 1. The cam 7 exerts no influence on the feed lever 10 during this movement because the two curved arcuate parts of the cam 26 and 27 which during this movement slide along the upper and lower limits of the aperture 9 are arcs of circles the centres of which coincide with the axis of rotation of the shaft 5. The feed lever 10 can consequently execute no rotary movement during this part of the movement.

After the parts have reached the position according to Figure 2, the cam 7 starts to come into operation. It now presses with its curved part 28 against the part 17 of the feed lever 10 so that the latter rotates in a clockwise direction about the fixed axis 3 and reaches the position which is shown in Figure 3. On account of this movement the feed roller 1 is carried round by the pin 11 through one distance between adjacent hole 12. Since the eccentric pin 8 can move freely in the slot 22 during this part of the movement the control rod 20 remains stationary.

Upon further movement from the position shown in Figure 3 the control rod 20 and with it also the feed lever 10 are moved to the left by the eccentric pin 8. The pin 23 now arrests the feed roller 1 and the feed pin 11 becomes disengaged. Upon further movement the cam 7 comes again into operation and rotates the lever 10 back into the starting position shown in Figure 1.

The feed roller 1 is consequently periodically rotated by the pin 11 by the distance apart of the holes 12 in a clockwise direction. During the return movement of the pin 11 the feed roller is held stationary by the pin 23. During this stationary period of the feed roller each time one picture frame of the film is held in front of the picture window for projection.

The mechanism operates entirely without noise since the relative movements between the parts are sliding movements. Moreover the film is stretched to an extraordinarily small amount mechanically because it can rest uniformly on the feed roller and always a large number of teeth is in engagement with the perforations of the film.

Whilst in the foregoing a preferred embodiment of this invention has been described in detail it is to be understood that various modifications may be made without departing from the scope thereof.

I declare, that what I claim is:

1. A film feeding mechanism for cinematograph films comprising a film feed roller, a stationary central supporting shaft for same, a peripheral series of apertures in said roller, a feed lever, a sliding connection between said feed lever and said stationary shaft to permit rotary and radial movement of said lever, a feed pin on the end of said feed lever for engaging the said apertures, means for intermittently oscillating said feed lever about said stationary shaft and means for intermittently reciprocating said feed lever radially of said stationary shaft to bring the feed pin into and out of engagement with said apertures, the said means for oscillating said feed lever being so connected with the means for reciprocating said lever that a radial movement of the lever in one direction always follows an oscillatory movement in one sense and a radial movement in the other direction always follows an oscillatory movement in the other sense.

2. A film feeding mechanism for cinematograph apparatus comprising a film feed roller, a stationary central shaft for rotatably supporting said feed roller a peripheral series of holes in said feed roller, a feed lever, a longitudinal slot in said feed lever embracing said stationary shaft, a feed pin on one end of said feed lever, a rotary driving shaft, a cam on said driving shaft, a yoke on said feed lever embracing said cam, spaced lift portions on said cam for engaging with said yoke and for oscillating said feed lever intermittently about said stationary shaft, and means for alternately and intermittently moving said feed lever radially so as to move the feed pin into and out of engagement with said holes between successive oscillatory strokes of said lever.

3. A film feeding mechanism for cinematograph apparatus comprising a film feed roller, a stationary control shaft for rotatably supporting said feed roller, a peripheral series of holes in said feed roller, a feed lever, a longitudinal slot in said feed lever embracing said stationary shaft, a feed pin on one end of said lever of a size to fit into said holes, a rotary driving shaft eccentric to said stationary shaft, a cam on said driving shaft said cam comprising diametrically opposed portions which are arcs of circles of different radii having a common centre at the centre of the driving shaft and lift portions joining said arcuate portions, a yoke on said feed lever embracing said cam, the said yoke having parallel longitudinal cam engaging portions spaced apart by at least the sum of the radii of the arcuate parts of the cam, an eccentric pin carried by the face of said cam and symmetrically disposed with respect to said cam off the centre towards the arcuate part of greater radius, a control rod, a longitudinal slot in said control rod embracing said stationary shaft, a pin and slot connection between said control rod and feed lever to permit of relative rotary movements therebetween, a transverse arcuate slot on said control rod embracing said eccentric pin and means for constraining said control rod to move radially only with respect to the stationary shaft.

4. A film feeding mechanism for cinematograph apparatus comprising a film feed roller, a stationary control shaft for rotatably supporting said feed roller, a peripheral series of holes in said feed roller, a feed lever, a longitudinal slot in said feed lever embracing said stationary shaft, a feed pin on one end of said lever of a size to fit into said holes, a rotary driving shaft eccentric to said stationary shaft, a cam on said driving shaft said cam comprising diametrically opposed portions which are arcs of circles of different radii having a common centre at the centre of the driving shaft and lift portions joining said arcuate portions, a yoke on said feed lever embracing said cam, the said yoke having parallel longitudinal cam engaging portions spaced apart by at least the sum of the radii of the arcuate parts of the cam, an eccentric pin carried by the face of said cam and symmetrically disposed with respect to said cam off the centre towards the arcuate part of greater radius, a control rod, a longitudinal slot in said control rod embracing said stationary shaft, a pin and slot connection between said control rod and feed lever to permit of relative rotary movements therebetween, a transverse arcuate slot on said control rod embracing said eccentric pin, a control pin carried at the end of said control rod, a second annular series of holes on said feed roller in which said control pin engages on being moved radially outwards and means for constraining said control pin to move radially with respect to said shaft.

5. A film feeding mechanism for cinematograph apparatus comprising a film feed roller, a stationary central shaft for rotatably supporting said feed roller, a peripheral series of holes in said feed roller, a feed lever, a longitudinal slot in said feed lever embracing said stationary shaft, a feed pin on one end of said lever of a size to fit into said holes, a rotary driving shaft eccentric to said stationary shaft, a cam on said driving shaft said cam comprising diametrically opposed portions which are arcs of circles of different radii having a common centre at the centre of the driving shaft and lift portions joining said arcuate portions, a yoke on said feed lever embracing said cam, the said yoke having parallel longitudinal cam engaging portions spaced apart by at least the sum of the radii of the arcuate parts of the cam, an eccentric pin carried by the face of said cam and symmetrically disposed with respect to said cam off the centre towards the arcuate part of greater radius, a control rod, a longitudinal slot in said control rod embracing said stationary shaft, a pin and slot connection between said control rod and feed lever to permit of relative rotary movements therebetween, a transverse arcuate slot on said control rod embracing said eccentric pin a control pin carried at the end of said control rod, a second annular series of holes in said feed roller in which said control pin engages on being moved radially outwards means for constraining said control pin to move radially with respect to said shaft and a spring connected to said feed lever and to a stationary part for maintaining one side of said yoke always in close engagement with said cam.

6. In film feeding mechanism for cinematograph apparatus, an annular member, means for rotatably supporting said annular member, a series of depressions in said annular member, a feed lever, a feed pin on said feed lever for engaging in said depressions, means for constraining said feed lever to be always radial with respect to said annular member, means for oscillating said feed lever back and forth intermittently through the arcuate distance between successive depressions, a control member, a control pin on said control member, a second series of depressions on said annular member, means for reciprocating said control member radially of said annular member to bring said control pin into and out of engagement with depressions of said second series intermittently between successive oscillatory movements of said feed lever, and means for transmitting the reciprocatory movements of said control member to said feed lever to bring the feed pin into and out of engagement with said depressions of the first series.

7. In film feeding mechanism for cinematograph apparatus, an annular member, means for rotatably supporting said annular member, a series of depressions on said annular member, a feed lever, a feed pin on said feed lever for engaging in said depressions, means for constraining said feed lever to be always radial with respect to said annular member, cam means for oscillating said feed lever back and forth intermittently through the arcuate distance between successive depressions a control member, means for reciprocating said control member radially of said annular member, back and forth intermittently between successive oscillatory movements of said feed lever and means for transmitting said reciprocatory movements to said feed lever to bring the feed pin into and out of engagement with said depressions.

8. In film feeding mechanism for cinematograph apparatus, an annular member, means for rotatably supporting said annular member, a series of depressions on said annular member, a feed lever, a feed pin on said feed lever for engaging in said depressions, means for constraining said feed lever to be always radial with respect to said annular member, cam means for oscillating said feed lever back and forth intermittently through the arcuate distance between successive depressions, a control member, a control pin on said control member a second series of depressions on said annular member, means for reciprocating said control member radially of said annular member to bring said control pin into and out of engagement with depressions of said second series intermittently between successive oscillatory movements of said feed lever, and means for transmitting the reciprocatory movements of said control member to said feed lever to bring the feed pin into and out of engagement with said depressions of the first series.

9. In film feeding mechanism for cinematograph apparatus, an annular member, means for rotatably supporting said annular member, a series of depressions on said annular member, a feed lever, a feed pin on said feed lever for engaging in said depressions, means for constraining said feed lever to be always radial with respect to said annular member, cam means for oscillating said feed lever back and forth intermittently through the arcuate distance between successive depressions, a control member, eccentric means for reciprocating said control member radially of said annular member, back and forth intermittently between successive oscillatory movements of said feed lever and means for transmitting said reciprocatory movements to said feed lever to bring the feed pin into and out of engagement with said depressions.

10. In film feeding mechanism for cinematograph apparatus, an annular member, means for rotatably supporting said annular member, a series of depressions on said annular member, a feed lever, a feed pin on said feed lever for engaging in said depressions, means for constraining said feed lever to be always radial with respect to said annular member, cam means for oscillating said feed lever back and forth intermittently through the arcuate distance between successive depressions, a control member, a control pin on said control member a second series of depressions on said annular member, eccentric means for reciprocating said control member radially of said annular member to bring said control pin into and out of engagement with depressions of said second series intermittently between successive oscillatory movements of said feed lever, and means for transmitting the reciprocatory movements of said control member to said feed lever to bring the feed pin into and out of engagement with said depressions of the first series.

ERNST EISEMANN.